US012565986B2

(12) United States Patent
Bley et al.

(10) Patent No.: US 12,565,986 B2
(45) Date of Patent: *Mar. 3, 2026

(54) HEIGHT ADJUSTABLE LAMP

(71) Applicant: Hatco Corporation, Milwaukee, WI (US)

(72) Inventors: Taylor Bley, Milwaukee, WI (US); James P. Virgin, Milwaukee, WI (US); James Jakubowski, Milwaukee, WI (US); Dan Frigo, Milwaukee, WI (US)

(73) Assignee: HATCO CORPORATION, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/829,676

(22) Filed: Sep. 10, 2024

(65) Prior Publication Data

US 2025/0003579 A1 Jan. 2, 2025

Related U.S. Application Data

(63) Continuation of application No. 18/538,182, filed on Dec. 13, 2023, now Pat. No. 12,111,041.

(60) Provisional application No. 63/437,539, filed on Jan. 6, 2023.

(51) Int. Cl.

| | |
|---|---|
| ***F21V 21/18*** | (2006.01) |
| ***F21S 8/06*** | (2006.01) |
| ***F21V 21/008*** | (2006.01) |
| ***F21V 21/108*** | (2006.01) |

(52) U.S. Cl.

CPC .............. *F21V 21/18* (2013.01); *F21S 8/061* (2013.01); *F21V 21/008* (2013.01); *F21V 21/108* (2013.01)

(58) Field of Classification Search

CPC .......... F21V 21/18; F21V 21/22; F21V 21/38; F21V 21/008; F21V 21/16; F21V 21/108; F21V 27/00; F21S 8/061

See application file for complete search history.

(56) References Cited

U.S. PATENT DOCUMENTS

| | | | | |
|---|---|---|---|---|
| 745,670 A * | 12/1903 | Riley | ................ | B65H 75/4449 248/579 |
| 1,659,160 A * | 2/1928 | Richards | ................ | F21V 27/00 191/12.2 R |
| 3,567,152 A | 3/1971 | Heisler | | |
| 3,763,368 A | 10/1973 | Baggott | | |
| 5,556,195 A | 9/1996 | Glebe | | |

(Continued)

FOREIGN PATENT DOCUMENTS

| | | | | |
|---|---|---|---|---|
| CN | 108240580 A * | 7/2018 | .............. | F21V 21/38 |
| CN | 110017453 A * | 7/2019 | .............. | F21V 27/00 |

(Continued)

OTHER PUBLICATIONS

English Translation of CN-111994737 (Year: 2020).*

*Primary Examiner* — Zheng Song

(74) *Attorney, Agent, or Firm* — Foley & Lardner LLP

(57) ABSTRACT

A height adjustable lamp assembly includes a frame defining a cord aperture, a reel rotationally supported by the frame, an electrical cord wound around the reel where a lower end of the electrical cord extends through the cord aperture, and a lamp coupled to the lower end of the electrical cord. The reel rotates to wind up or pay out the electrical cord therefrom to adjusts a height of the lamp.

16 Claims, 14 Drawing Sheets

(56) References Cited

U.S. PATENT DOCUMENTS

| | | | | |
|---|---|---|---|---|
| 7,311,425 | B2 | 12/2007 | Jervey | |
| 7,494,254 | B2 | 2/2009 | Rogers | |
| 8,348,215 | B1 * | 1/2013 | Smith | F04D 25/088 242/390.8 |
| 11,435,072 | B1 | 9/2022 | Shott et al. | |
| 2008/0074893 | A1 | 3/2008 | Ham | |
| 2014/0036517 | A1 | 2/2014 | Machiorlette | |
| 2014/0145129 | A1 * | 5/2014 | Bauder | F21V 21/16 254/275 |
| 2014/0284160 | A1 | 9/2014 | Towe et al. | |
| 2019/0006833 | A1 | 1/2019 | Hall et al. | |
| 2019/0086045 | A1 | 3/2019 | Solterbeck | |
| 2021/0126410 | A1 | 4/2021 | Thomas et al. | |
| 2023/0227294 | A1 | 7/2023 | Dietz | |
| 2024/0154400 | A1 * | 5/2024 | Shin | F21V 21/38 |

FOREIGN PATENT DOCUMENTS

| | | | | | |
|---|---|---|---|---|---|
| CN | 111994737 | A | * | 11/2020 | B65H 75/4405 |
| CN | 116576437 | A | * | 8/2023 | F21V 21/38 |
| EP | 0676586 | A1 | * | 10/1995 | F21V 27/00 |
| WO | WO-2019/083314 | A1 | | 5/2019 | |
| WO | WO-2021/174161 | A1 | | 9/2021 | |
| WO | WO-2022/196980 | A1 | | 9/2022 | |

* cited by examiner

HEIGHT ADJUSTABLE LAMP

CROSS-REFERENCE TO RELATED PATENT APPLICATIONS

This application is a continuation of U.S. patent application Ser. No. 18/538,182, filed Dec. 13, 2023, which claims the benefit of and priority to U.S. Provisional Application No. 63/437,539, filed on Jan. 6, 2023, both of which are incorporated herein by reference in their entireties.

BACKGROUND

Heat lamps may be used in restaurants and by other food purveyors to regulate the temperature of food products such that the food products are maintained at a desirable temperature prior to being served to patrons.

SUMMARY

One embodiment relates to a height adjustable lamp assembly. The height adjustable lamp assembly includes a frame defining a cord aperture, a reel rotationally supported by the frame, an electrical cord wound around the reel where a lower end of the electrical cord extends through the cord aperture, and a lamp coupled to the lower end of the electrical cord. The reel rotates to wind up or pay out the electrical cord therefrom to adjusts a height of the lamp.

Another embodiment relates to a height adjustable lamp assembly. The height adjustable lamp assembly includes a frame, a reel rotationally supported by the frame, a canopy surrounding the frame and the reel, an electrical cord wound around the reel where a lower end of the electrical cord extends beneath the frame, and a lamp coupled to the lower end of the electrical cord.

Still another embodiment relates to a height adjustable lamp assembly. The height adjustable lamp assembly includes a frame, a reel rotationally supported by the frame, a canopy surrounding the frame and the reel, an electrical cord wound around the reel where a lower end of the electrical cord extends beneath the frame, and a lamp coupled to the lower end of the electrical cord. The reel includes a spring. As the lamp is manually lifted by an operator, the spring causes the reel to rotate to wind up the electrical cord.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
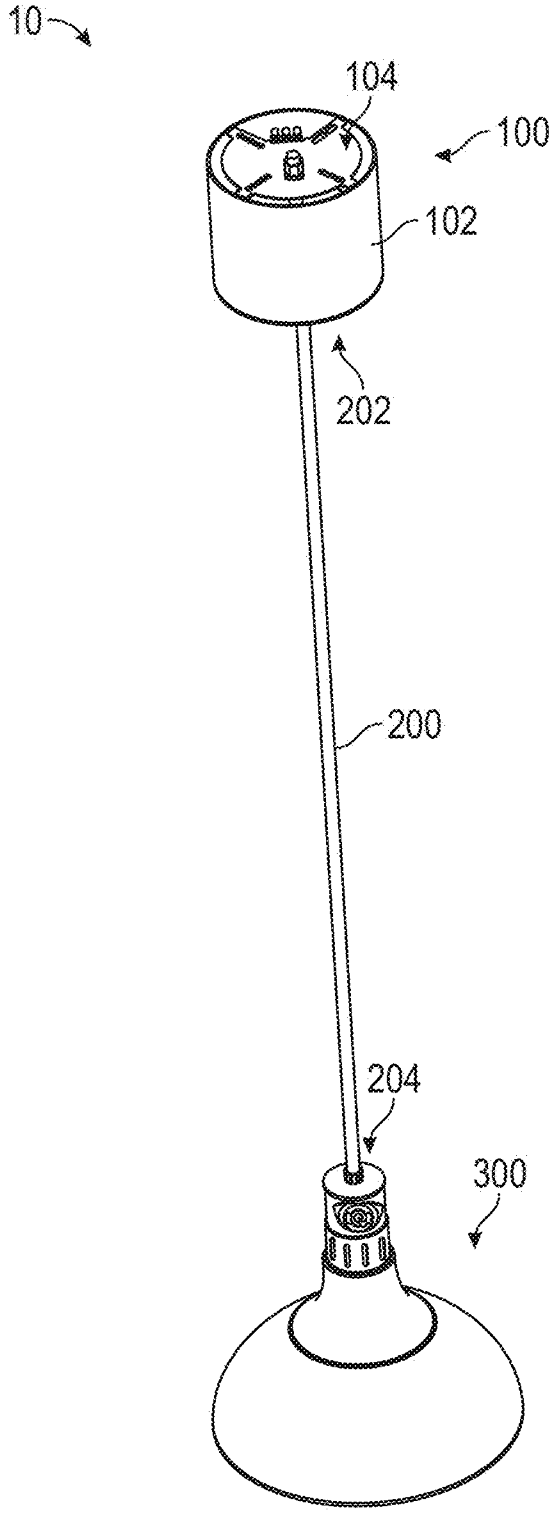
FIG. 1 is a perspective view of a height adjustable lamp assembly, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As shown in FIGS. 1-3, 11, and 12, a temperature regulation unit, shown as height adjustable lamp assembly 10, includes an upper, fixed portion, shown as canopy assembly 100; an electrical cable, shown as cord 200, having a first end, shown as upper end 202, coupled to the canopy assembly 100 with the cord 200 extending downward therefrom and an opposing second end, shown as lower end 204; and a height adjustable portion (e.g., a device, a tool, an implement, etc.), shown as lamp 300, coupled to the lower end 204 of the cord 200. According to an exemplary embodiment, at least a portion of the cord 200 is selectively extendable from and retractable into the canopy assembly 100 to adjust a length L of the cord 200 extending from the canopy assembly 100 and, therefore, a height of the lamp 300 above a surface (e.g., a warming rack, a table, a bar top, a serving counter, etc.) beneath the height adjustable lamp assembly 10.

Figure 2:
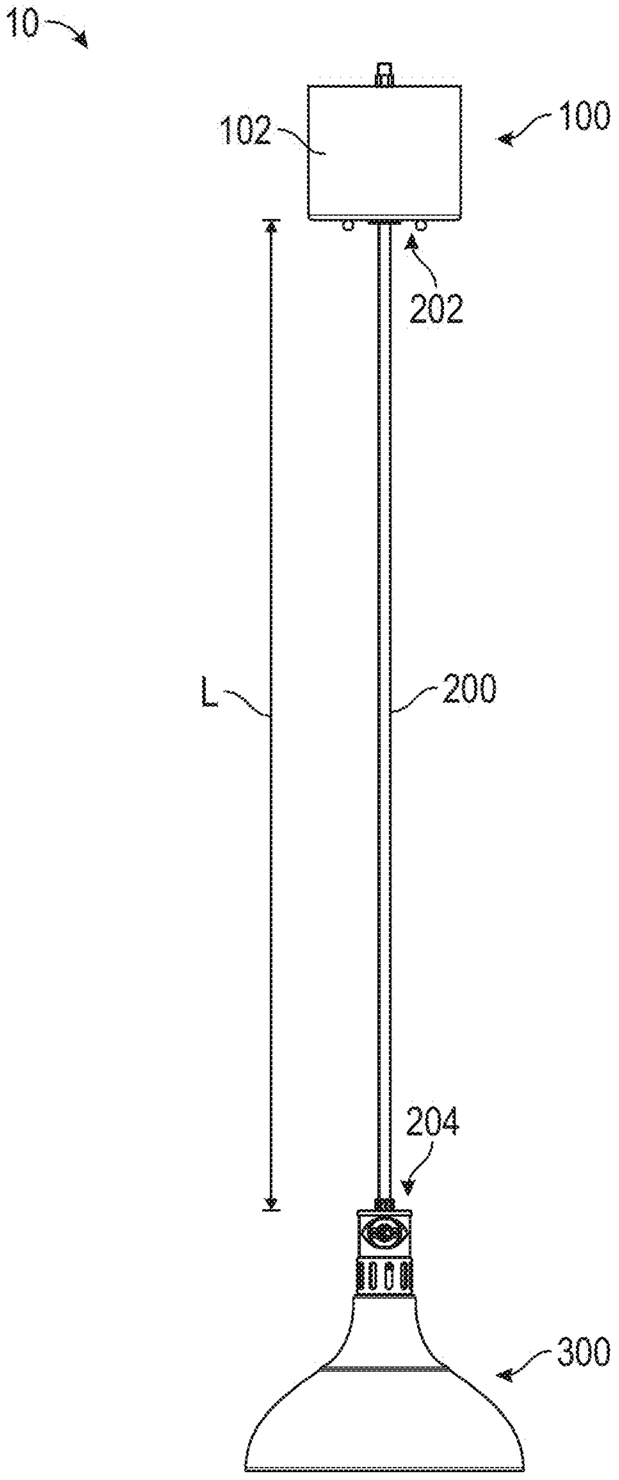
FIG. 2 is a front view of the height adjustable lamp assembly of FIG. 1, according to an exemplary embodiment.
Figure 3:
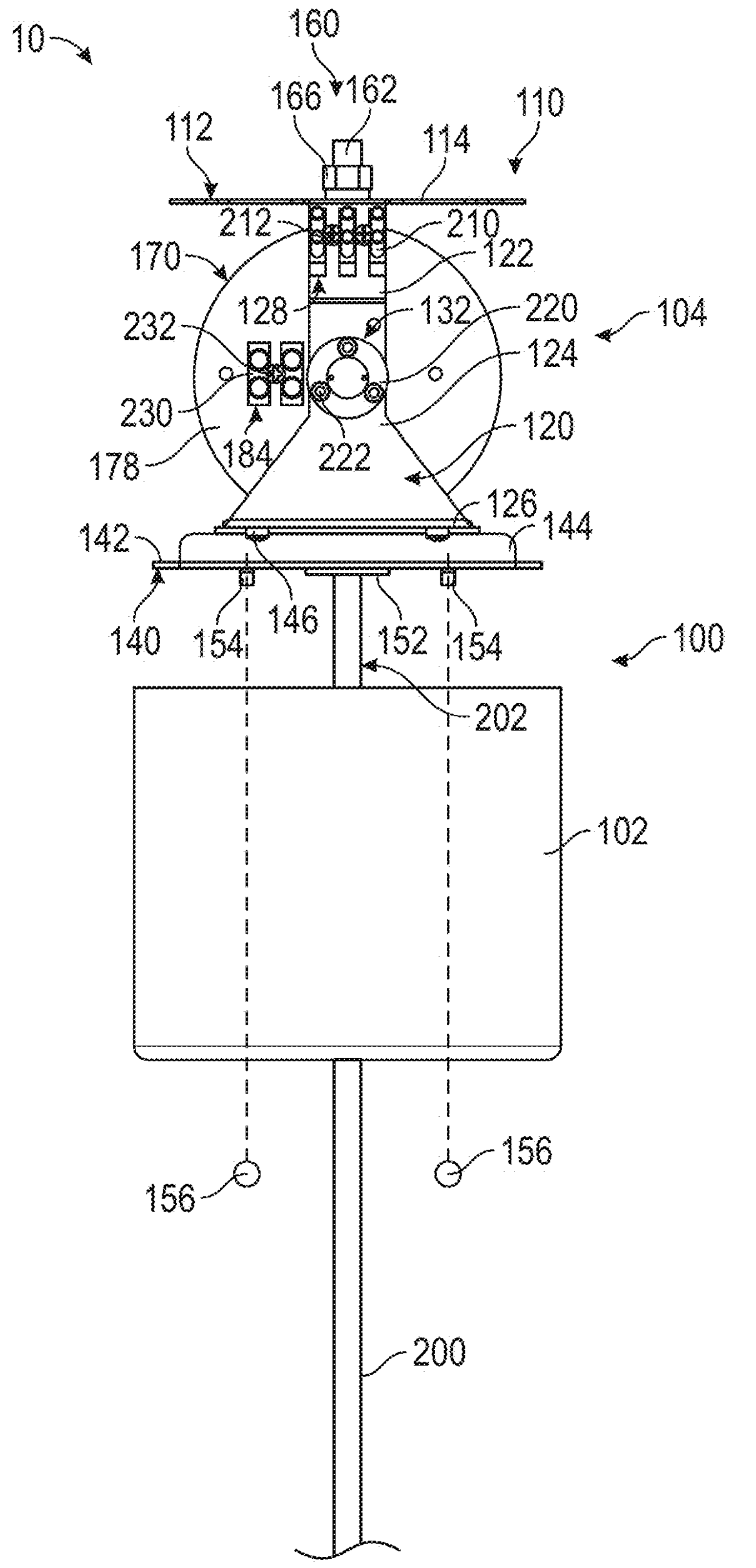
FIG. 3 is an exploded view of a canopy assembly of the height adjustable lamp assembly of FIG. 1, according to an exemplary embodiment.

As shown in FIGS. 1-3, the canopy assembly 100 includes a housing (e.g., shroud, cover, etc.), shown as canopy 102, and a support assembly, shown as frame and reel assembly 104, removably received within and surrounded or covered by the canopy 102 (e.g., when the height adjustable lamp assembly 10 is installed and mounted to a ceiling, a beam, an overhead support, a utility box, etc.). As shown in FIGS. 3-7, the frame and reel assembly 104 includes a support structure or assembly, shown as frame 110, and a winding or spooling assembly, shown as reel 170, rotatably supported by the frame 110.

Figure 4:
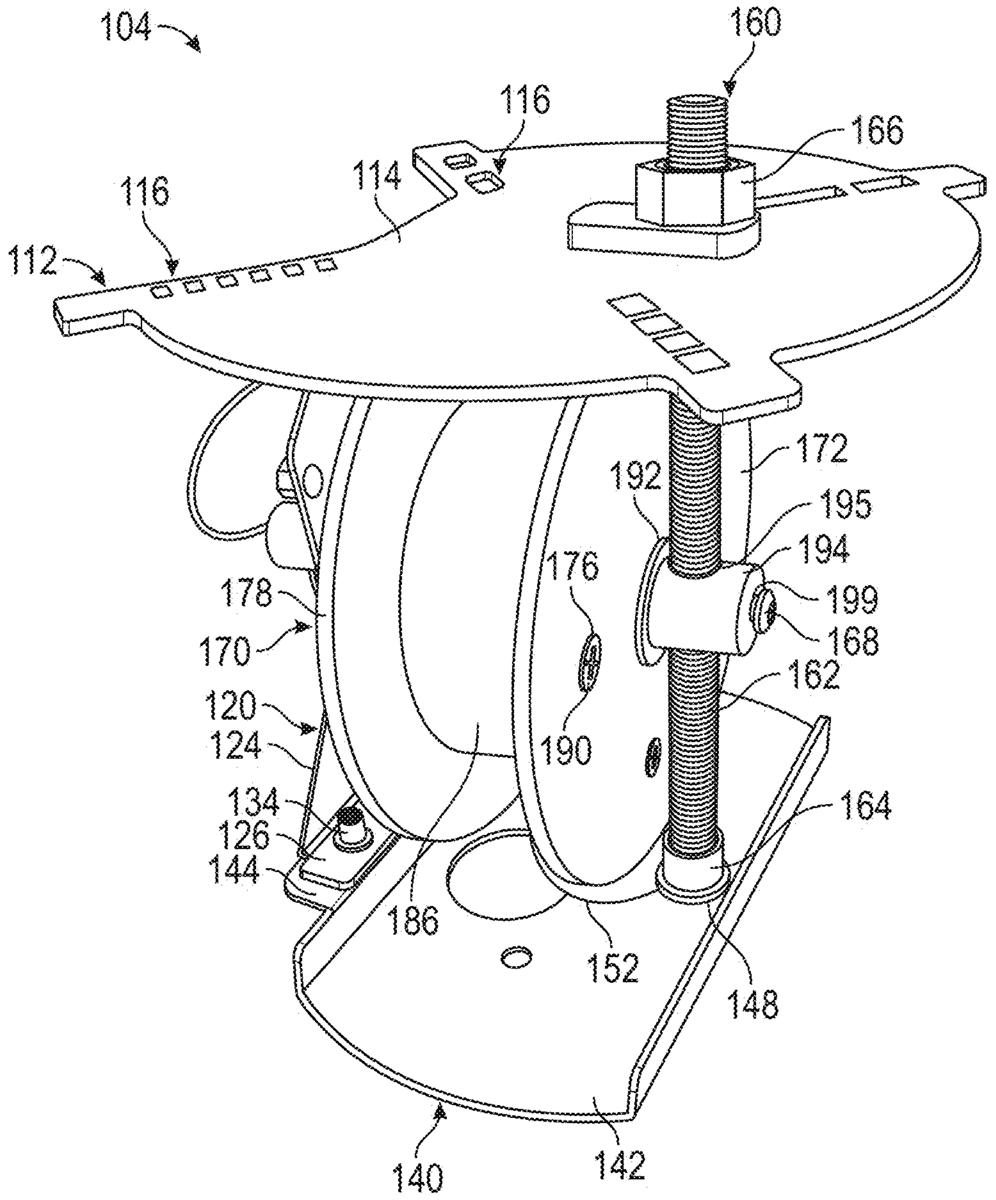
FIGS. 4-6 are various perspective views of a frame and reel assembly of the canopy assembly of FIG. 3, according to an exemplary embodiment.
Figure 5:
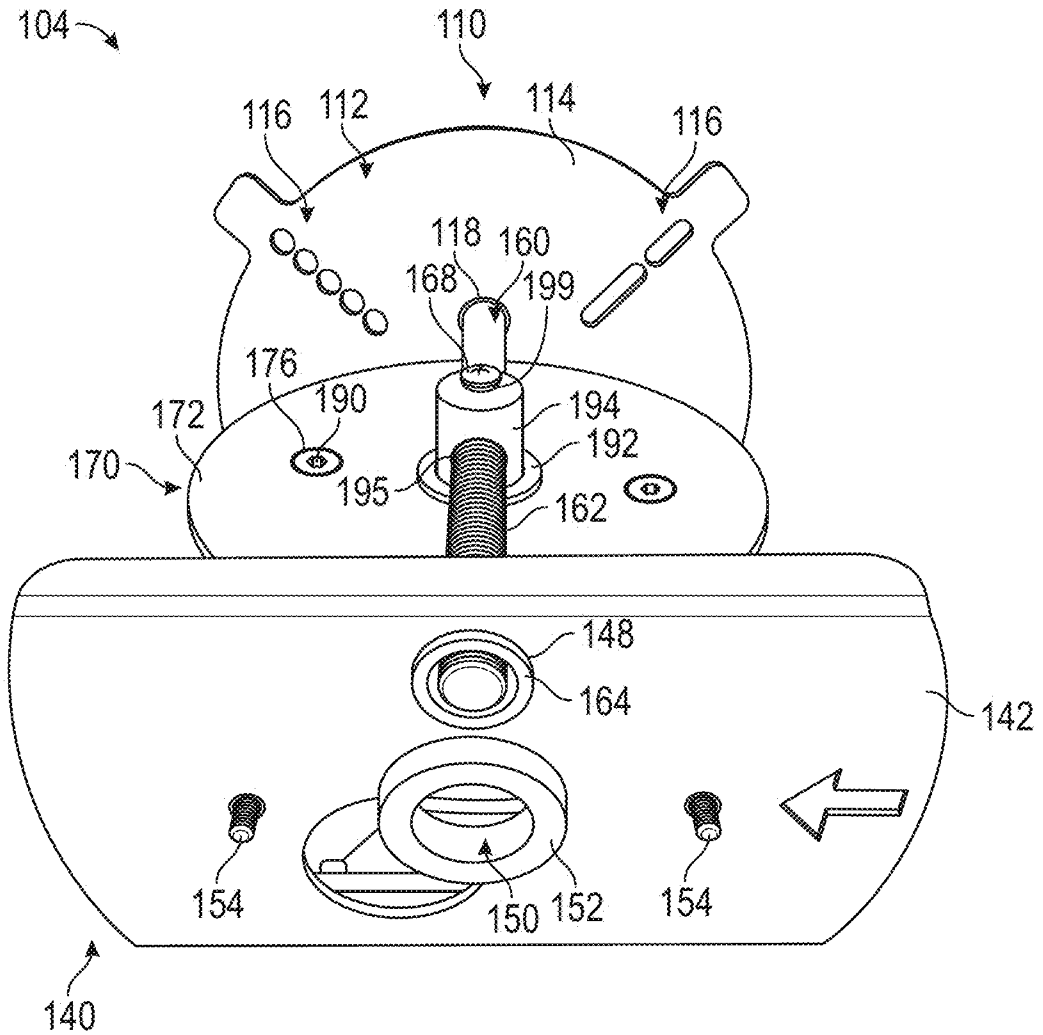
Figure 6:
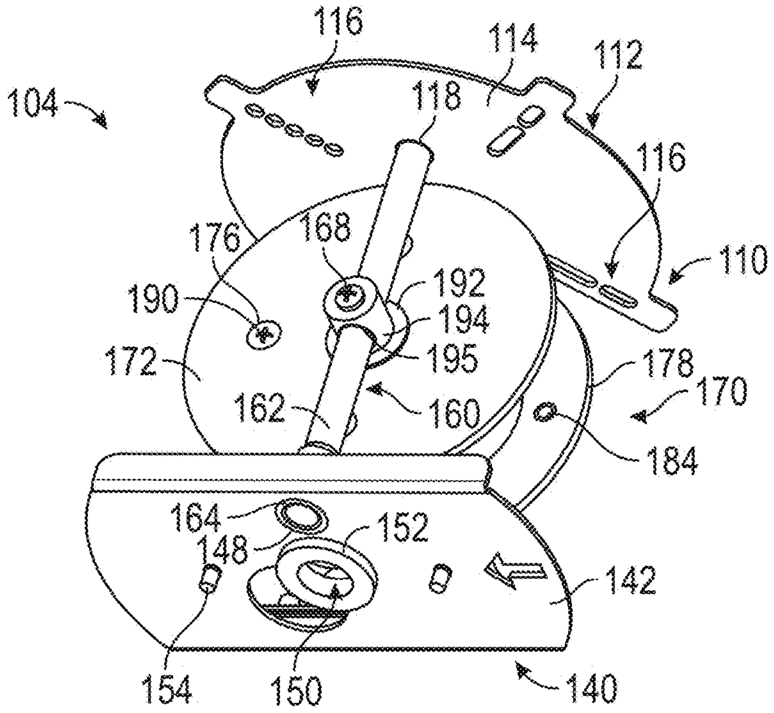

As shown in FIGS. 3-7, the frame 110 includes a first portion, shown as upper mounting portion 112, a second portion, shown as arm 120, a third portion, shown as base 140, and a fourth portion, shown as rod assembly 160. The upper mounting portion 112 include a plate, shown as mounting plate 114. As shown in FIGS. 4-6, the mounting plate 114 defines a plurality of first apertures, shown as mounting holes 116, positioned variously about the mounting plate 114. According to an exemplary embodiment, the mounting holes 116 facilitate mounting the mounting plate 114 and, thereby, the height adjustable lamp assembly 10 to a mounting surface (e.g., a ceiling, a beam, an overhead support, a utility box, etc.) using a plurality of fasteners. As shown in FIGS. 5 and 6, the mounting plate 114 defines a second aperture, shown as rod aperture 118.

Figure 7:
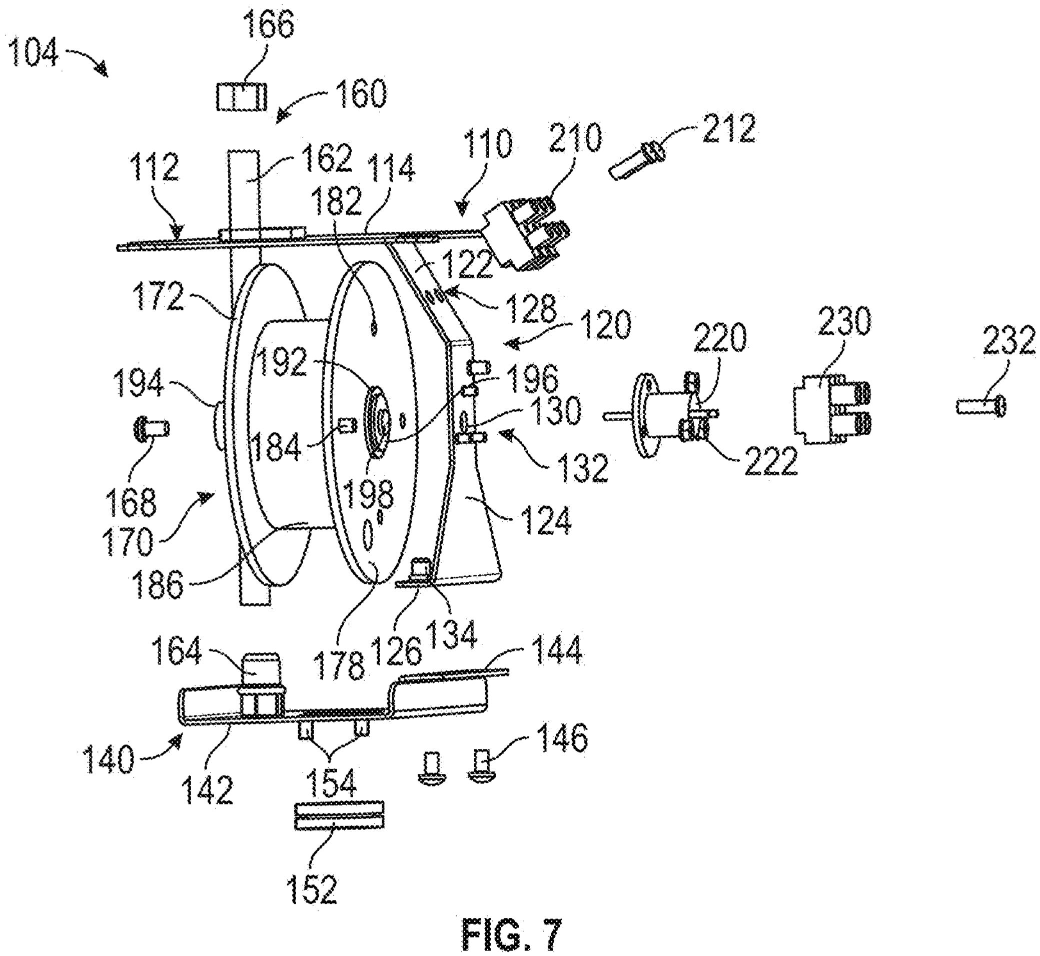
FIG. 7 is an exploded view of the frame and reel assembly of FIGS. 4-6, according to an exemplary embodiment.

As shown in FIGS. 3, 4, and 7, the arm 120 has (i) a first portion, shown as upper arm portion 122, extending downward at an angle from an edge of the mounting plate 114 at a first side of the mounting plate 114 (opposite a second side of the mounting plate 114 to which the rod aperture 118 is proximate) and (ii) a second portion, shown as lower arm portion 124, extending downward from the upper arm portion 122 substantially vertically and terminating with a mounting portion, shown as arm mounting flange 126. According to the exemplary embodiment shown in FIGS. 3 and 7, the arm 120 is integrally formed with the mounting plate 114 (e.g., the mounting plate 114 and the arm 120 are machined, cut, bent, etc. from a single piece of material or metal, the mounting plate 114 and the arm 120 are welded, etc.). In other embodiments, the arm 120 is detachably coupled to the mounting plate 114 (e.g., with fasteners).

As shown in FIG. 7, the upper arm portion 122 defines a first interface, shown as electrical connector mount 128. According to an exemplary embodiment, the electrical connector mount 128 includes one or more threaded apertures. In other embodiments, the electrical connector mount 128 includes one or more threaded protrusions or posts. In still other embodiments, the electrical connector mount 128 includes one or more non-threaded apertures. As shown in FIG. 7, the lower arm portion 124 defines an aperture, shown as slip ring aperture 130, and a second interface, shown as slip ring mount 132. According to an exemplary embodiment, the slip ring mount 132 incudes a plurality of threaded protrusions or posts. In other embodiments, the slip ring mount 132 includes one or more threaded apertures. In still other embodiments, the slip ring mount 132 includes one or more non-threaded apertures. As shown in FIGS. 4 and 7, the arm mounting flange 126 defines a third interface, shown as base mount 134. According to an exemplary embodiment, the base mount 134 includes one or more threaded apertures or receivers. In other embodiments, the base mount 134 includes one or more threaded protrusions or posts. In still other embodiments, the base mount 134 includes one or more non-threaded apertures.

As shown in FIGS. 3-7, the base 140 includes a plate, shown as base plate 142. As shown in FIGS. 3, 4, and 7, the base plate 142 has a mounting portion, shown as base mounting flange 144, extending upward from one side of the base plate 142. The base mounting flange 144 of the base 140 and the arm mounting flange 126 of the arm interface with one another. The base 140 includes first fasteners, shown as fasteners 146, that extend through the base mounting flange 144 and the arm mounting flange 126 (e.g., apertures or slots defined thereby), and engage with the base mount 134 to releasably secure or couple the base 140 to the mounting plate 114 and the arm 120. According to the exemplary embodiment shown in FIG. 7, the fasteners 146 are screws or bolts. In other embodiments, the fasteners 146 are threaded protrusions or posts integrated into the base mounting flange 144. In still other embodiments, the fasteners 146 are nuts that engage with bolts above the arm mounting flange 126.

As shown in FIGS. 4-6, the base plate 142 defines a first aperture, shown as rod aperture 148. As shown in FIGS. 5 and 6, the base plate 142 defines a second aperture, shown as cord aperture 150. As shown in FIGS. 4-7, the base 140 includes a bushing, shown as cord bushing 152, that interfaces with and is received by the cord aperture 150. According to an exemplary embodiment, the cord 200 extends through the cord aperture 150, and the cord bushing 152 is configured to provide a smooth passage for the cord 200 to extend from and retract into (e.g., to prevent wear or damage to the cord 200). As shown in FIGS. 3 and 5-7, the base plate 142 defines an interface, shown as canopy mount 154. According to an exemplary embodiment, the canopy mount 154 includes a plurality of threaded protrusions or posts. As shown in FIG. 3, the base 140 includes second fasteners, shown as fasteners 156, that engage with the canopy mount 154 to releasably secure or couple the canopy 102 to the base plate 142 and, thereby, the canopy 102 to the frame and reel assembly 104 such that the canopy 102 selectively surrounds the frame and reel assembly 104. According to the exemplary embodiment shown in FIG. 3, the fasteners 156 are aesthetic cap nuts.

As shown in FIGS. 3-7, the rod assembly 160 includes an elongated shaft or pole, shown as threaded rod 162; a first fastener, shown as base fastener 164, that interfaces with and is received by the rod aperture 148 of the base plate 142, and receives the lower end of the threaded rod 162 to couple the threaded rod 162 to the base plate 142; and a second fastener, shown as mounting plate fastener 166, that receives the upper end of the threaded rod 162 extending through the rod aperture 118 of the mounting plate 114 to couple the threaded rod 162 to the mounting plate 114 such that the threaded rod 162 extends between the mounting plate 114 and the base plate 142.

Figure 8:
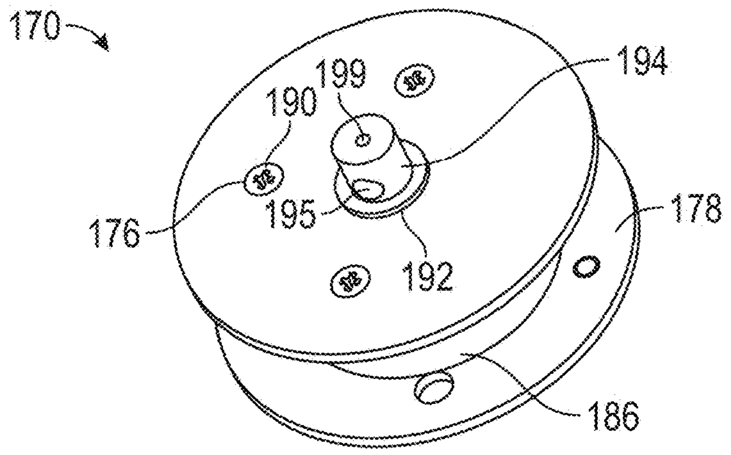
FIG. 8 is a perspective view of a reel of the frame and reel assembly of FIGS. 4-6, according to an exemplary embodiment.
Figure 9:
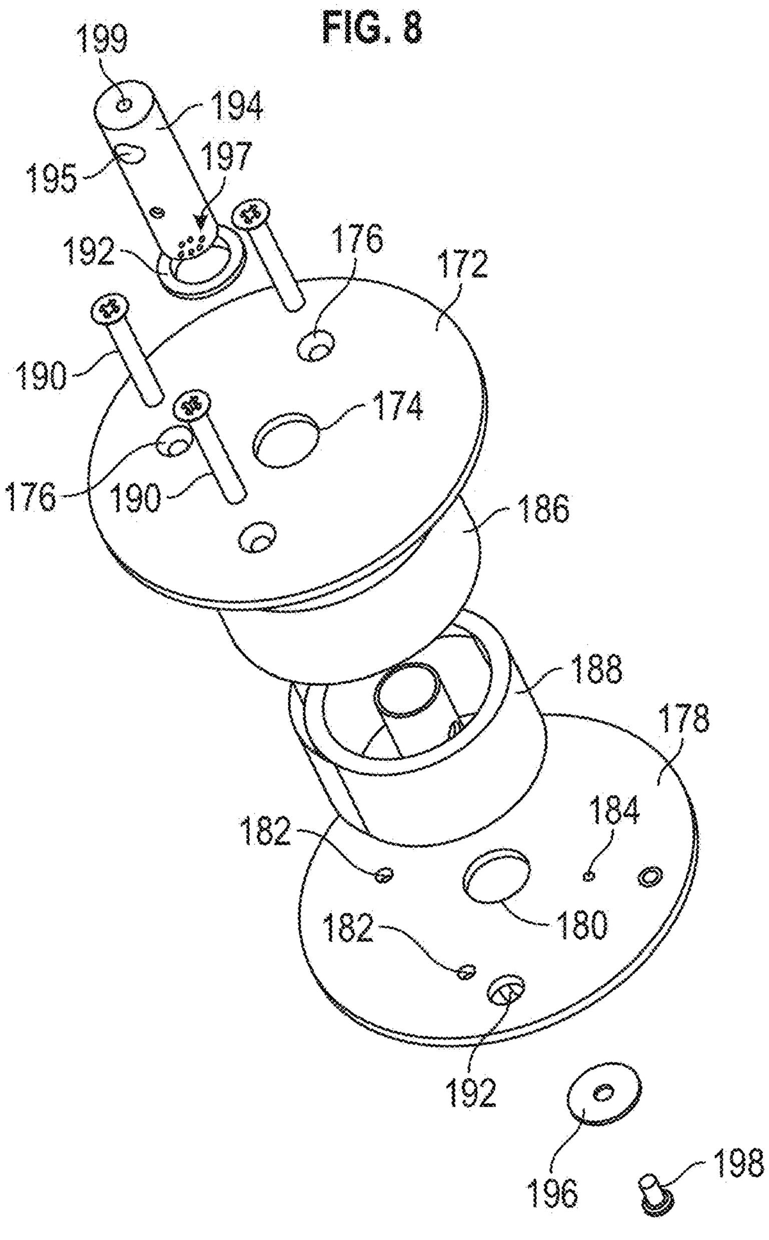
FIG. 9 is an exploded view of the reel of FIG. 8, according to an exemplary embodiment.

As shown in FIGS. 3-9, the reel 170 includes a first end plate, shown as first spool flange 172; a second end plate, shown as second spool flange 178; a central body portion, shown as spool body 186, positioned between the first spool flange 172 and the second spool flange 178; a biasing element or member, shown as spring 188, disposed within the spool body 186; a plurality of first fasteners, shown as spool fasteners 190; a plurality of bushings, shown as flange bushings 192; a shaft, shown as spool shaft 194; a spacer, shown as washer 196; and a second fastener (e.g., a screw), shown as spool shaft fastener 198. As shown in FIG. 9, the first spool flange 172 defines a first aperture, shown as first spool flange bore 174, and a plurality of second apertures, shown as first spool flange apertures 176. As shown in FIGS. 7-9, the second spool flange 178 defines a first aperture, shown as second spool flange bore 180, a plurality of second apertures, shown as second spool flange apertures 182, and an interface, shown as electrical connector mount 184. According to an exemplary embodiment, the first spool flange apertures 176 are non-treaded apertures and the second spool flange apertures 182 are threaded apertures. According to an exemplary embodiment, the electrical connector mount 184 includes a threaded aperture. In other embodiments, the electrical connector mount 184 includes a non-threaded aperture. In still other embodiments, the electrical connector mount 184 incudes a protrusion or post.

As shown in FIGS. 4-6, 8, and 9, the spool fasteners 190 extend through the first spool flange apertures 176 and engage with the second spool flange apertures 182 to couple the first spool flange 172 and the second spool flange 178 together, and thereby secure the spool body 186 and the spring 188 therebetween. As shown in FIGS. 4-9, the flange bushings 192 interface with and are received by the first spool flange bore 174 of the first spool flange 172 and the second spool flange bore 180 of the second spool flange 178.

As shown in FIGS. 4-6, 8, and 9, the spool shaft 194 extends through the flange bushing 192 and the first spool flange bore 174 of the first spool flange 172, the spring 188, and the spool body 186 to the flange bushing 192 and the second spool flange bore 180 of the second spool flange 178. The spool shaft 194 defines a plurality of apertures including a first aperture, shown as threaded rod through-hole 195, extending through the sidewall of the spool shaft 194 proximate a first end of the spool shaft 194; a second aperture, shown as aperture 197, defined by an opposing second end of the spool shaft 194; and a third aperture, shown as aperture 199, defined by the first end of the spool shaft 194. According to an exemplary embodiment, the aperture 199 extends through the first end of the spool shaft 194 to the threaded rod through-hole 195. As shown in FIGS. 4-6, the first end of the spool shaft 194 extends outward from the first spool flange 172 and the threaded rod 162 extends through the threaded rod through-hole 195 of the spool shaft 194, coupling the reel 170 to the rod assembly 160 and, thereby, the frame 110. The rod assembly 160 includes a third fastener, shown as set screw 168, that extends through the aperture 199 of the spool shaft 194 and engages with the threaded rod 162 to secure the reel 170 at a position along the height of the threaded rod 162. As shown in FIG. 7, the washer 196 engages with the flange bushing 192 for the second spool flange 178 and the spool shaft fastener 198 extends through the washer 196 and engages with the aperture 197 in the opposing second end of the spool shaft 194 to secure and rotationally couple the other components of the reel 170 (e.g., the spool body 186, the spring 188, the first spool flange 172, the second spool flange 178, etc.) to the spool shaft 194. Accordingly, the spool body 186, the spring 188, the first spool flange 172, the second spool flange 178, and the flange bushings 192 are configured to rotate about the spool shaft 194 and relative to the frame 110 (e.g., the mounting plate 114, the arm 120, the base 140, the rod assembly 160, etc.).

Figure 10:
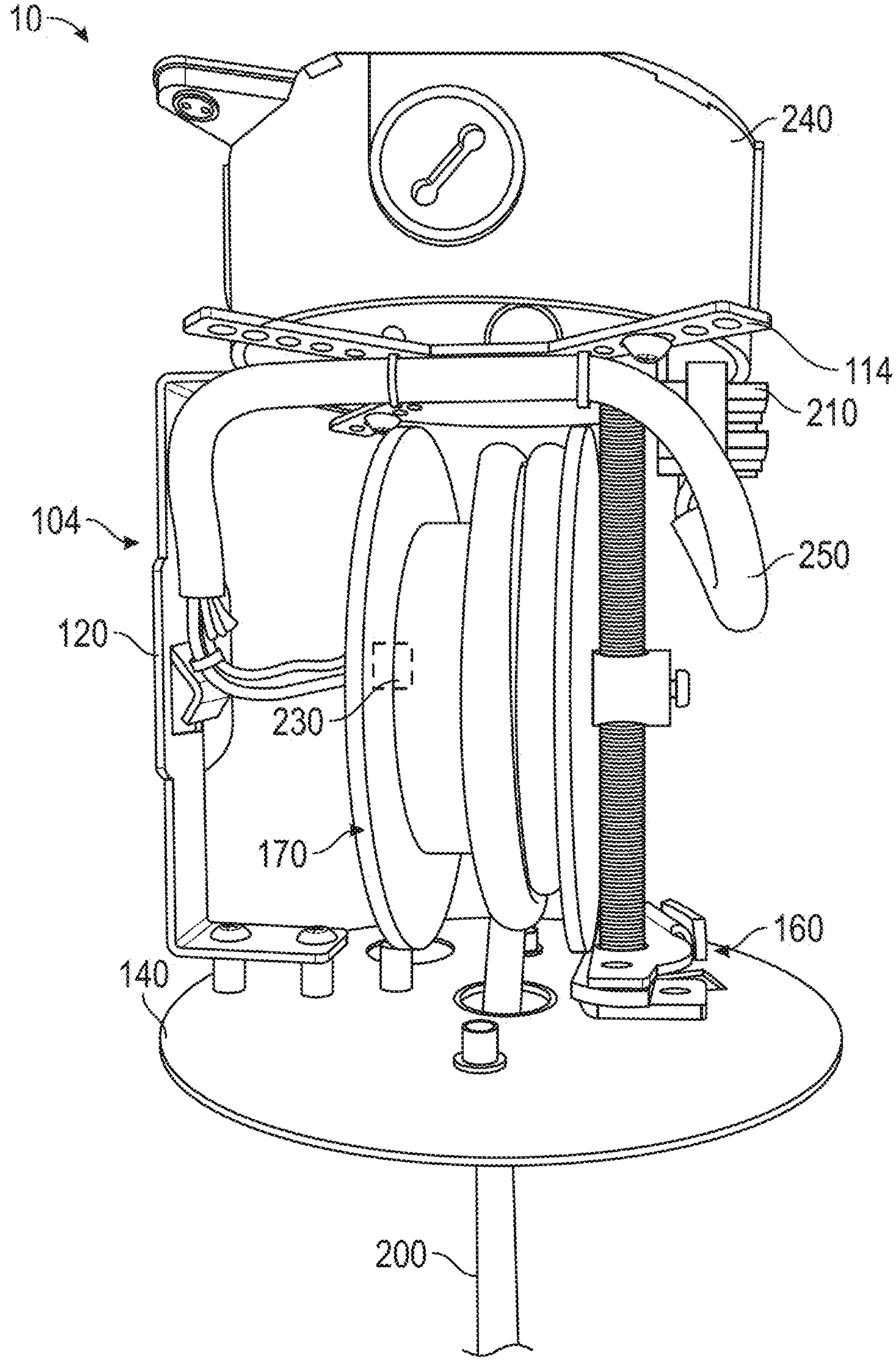
FIG. 10 is a perspective view of a frame and reel assembly of the canopy assembly of FIG. 3, according to another exemplary embodiment.

As shown in FIGS. 3 and 7, the frame and reel assembly 104 includes an electrical assembly having a plurality of electrical components including a first electrical connector, shown as utility box connector 210, coupled to the electrical connector mount 128 of the upper arm portion 122 of the arm 120 via one or more fasteners (e.g., screws, bolts, nuts, etc.), shown as fasteners 212; a second electrical connector, shown as slip ring 220, coupled to the slip ring mount 132 of the lower arm portion 124 of the arm 120 via one or more fasteners (e.g., nuts, screws, bolts, etc.), shown as fasteners 222, and positioned over the slip ring aperture 130 of the lower arm portion 124 of the arm 120; and a third electrical connector, shown as cable connector 230, coupled to the electrical connector mount 184 of the second spool flange 178 of the reel 170 via at least one fastener (e.g., screws, bolts, nuts, etc.), shown as fastener 232. According to an exemplary embodiment, the utility box connector 210 is configured to be electrically coupled to a mains power source through one or more wires running from the utility box connector 210 to a utility box (e.g., on a beam, in the ceiling, see utility box 240 shown in FIG. 10, etc.) that is electrically connected to the mains power source. According to an exemplary embodiment, (i) the slip ring 220 is configured to be electrically coupled to the utility box connector 210 through one or more wires running from the utility box connector 210 to the slip ring 220 and (ii) the slip ring 220 is configured to be electrically coupled to the cable connector 230 through one or more wires running from the slip ring 220 (e.g., through the slip ring aperture 130) to the cable connector 230. According to an exemplary embodiment, the cable connector 230 is configured to be electrically coupled to the upper end 202 of the cord 200. As shown in FIG. 10, the electrical assembly of the frame and reel assembly 104 does not include the slip ring 220. Rather, the utility box connector 210 is directly coupled to the cable connector 230 via wiring 250.

Figure 11:
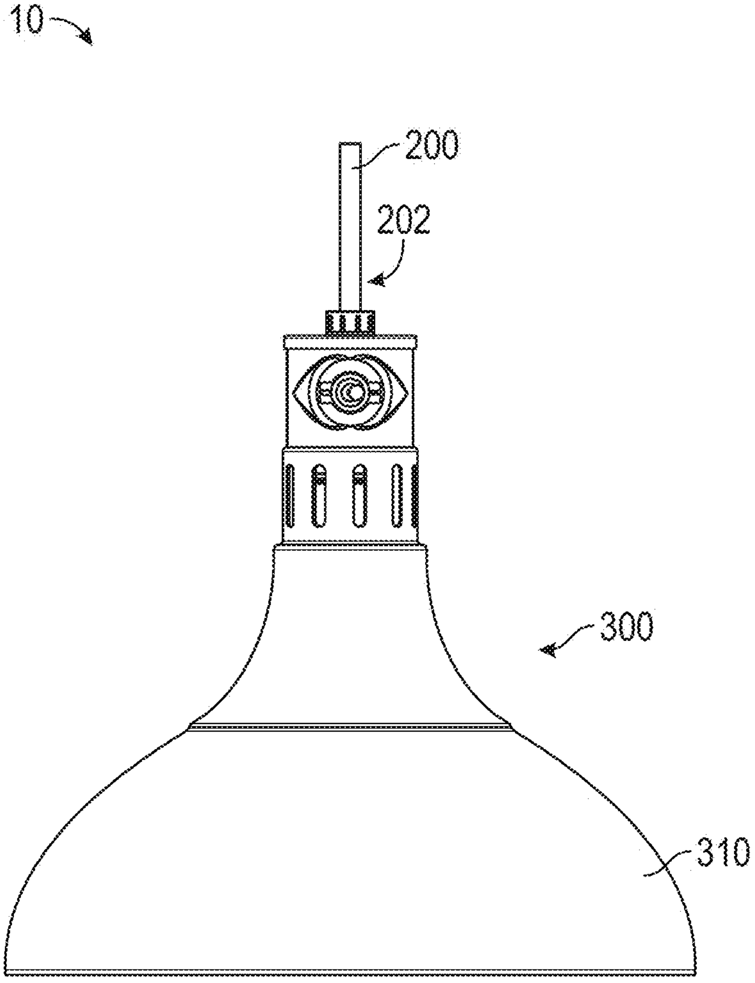
FIG. 11 is a perspective view of a lamp of the height adjustable lamp assembly of FIG. 1, according to various exemplary embodiments.
Figure 12:
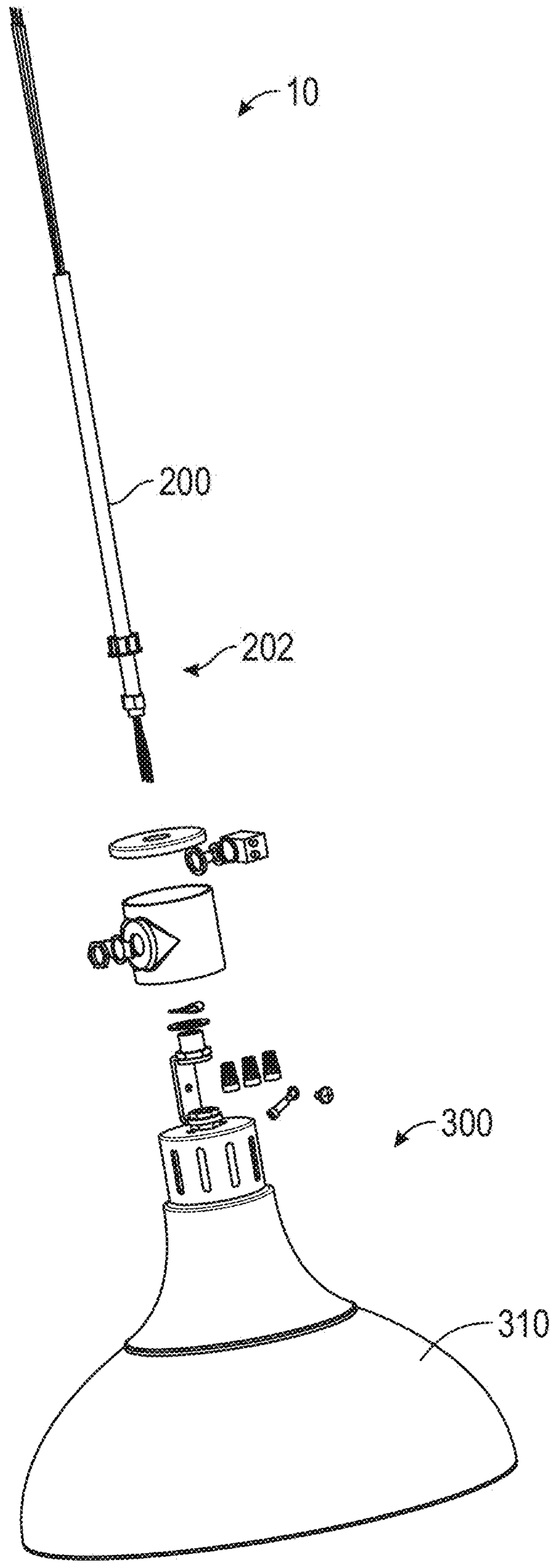
FIGS. 12 and 13 are various exploded views of the lamp of FIG. 11, according to an exemplary embodiment.
Figure 13:
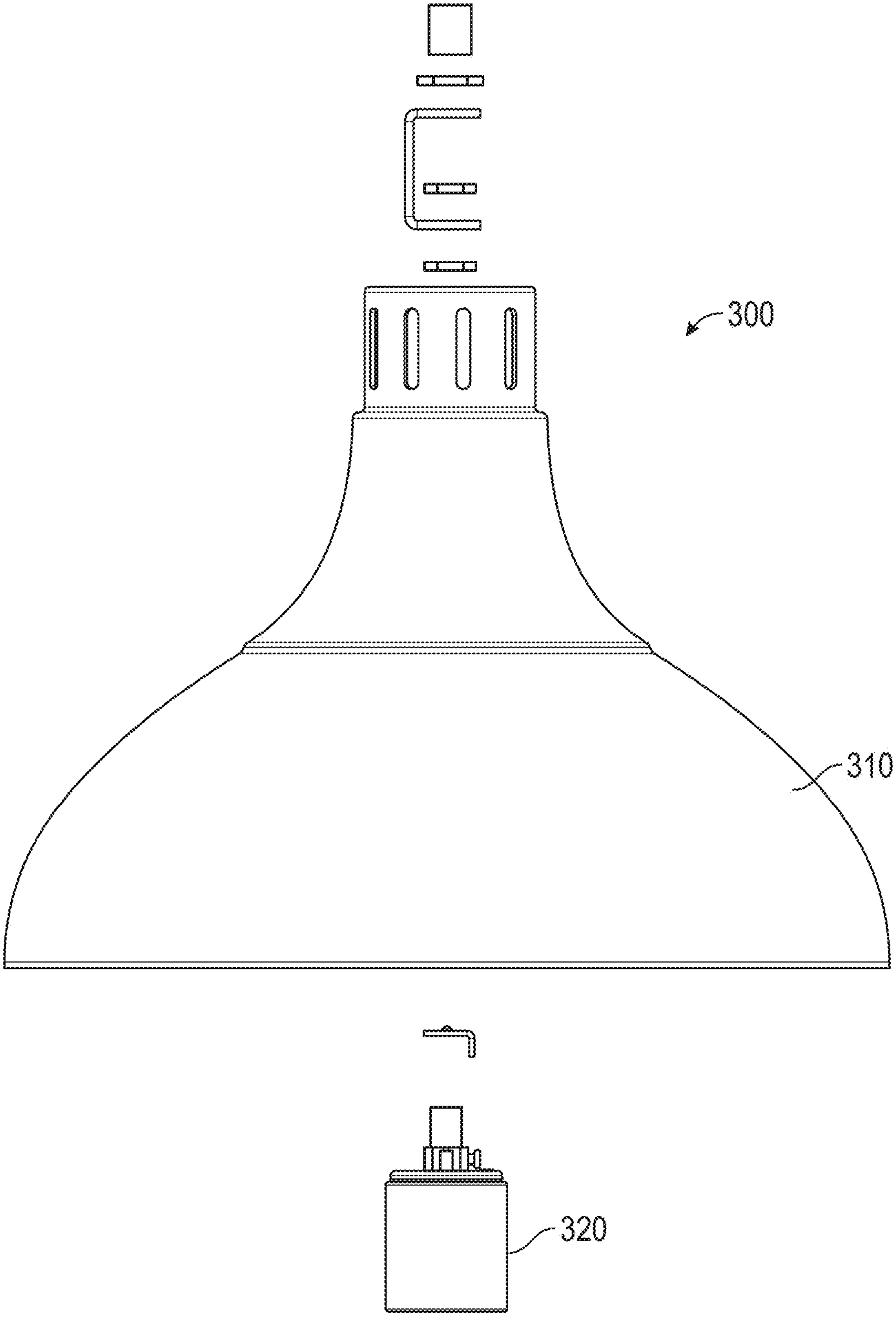
Figure 14:
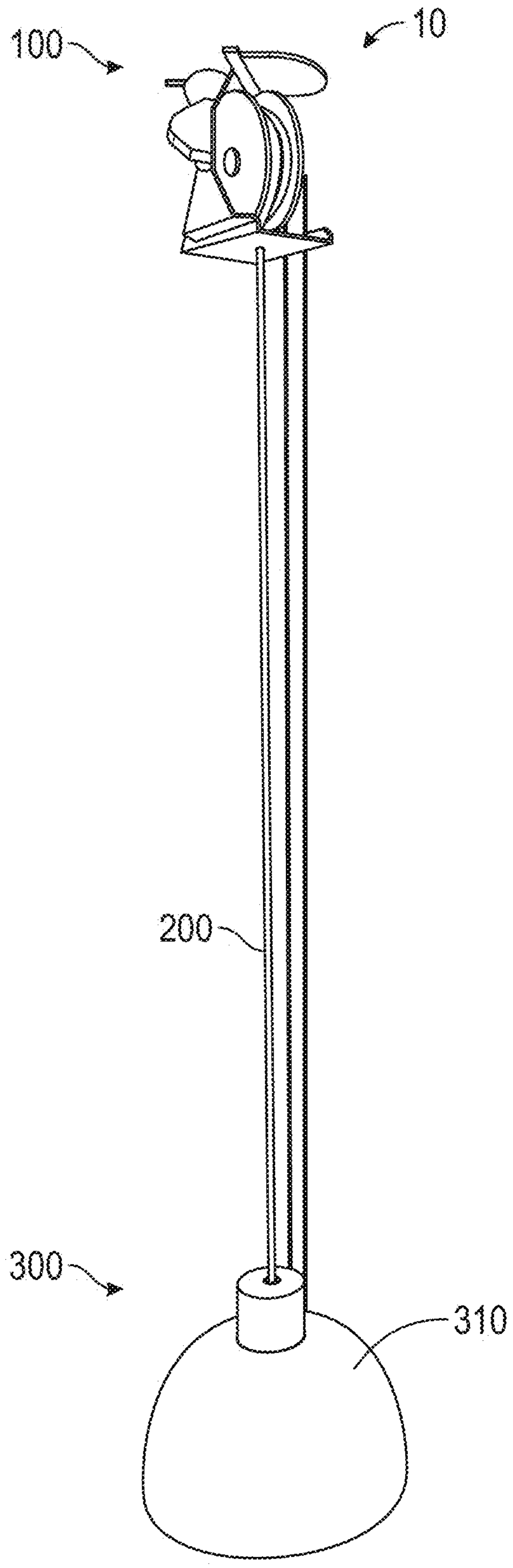
FIG. 14 is a perspective view of a height adjustable lamp assembly, according to another exemplary embodiment.
Figure 15:
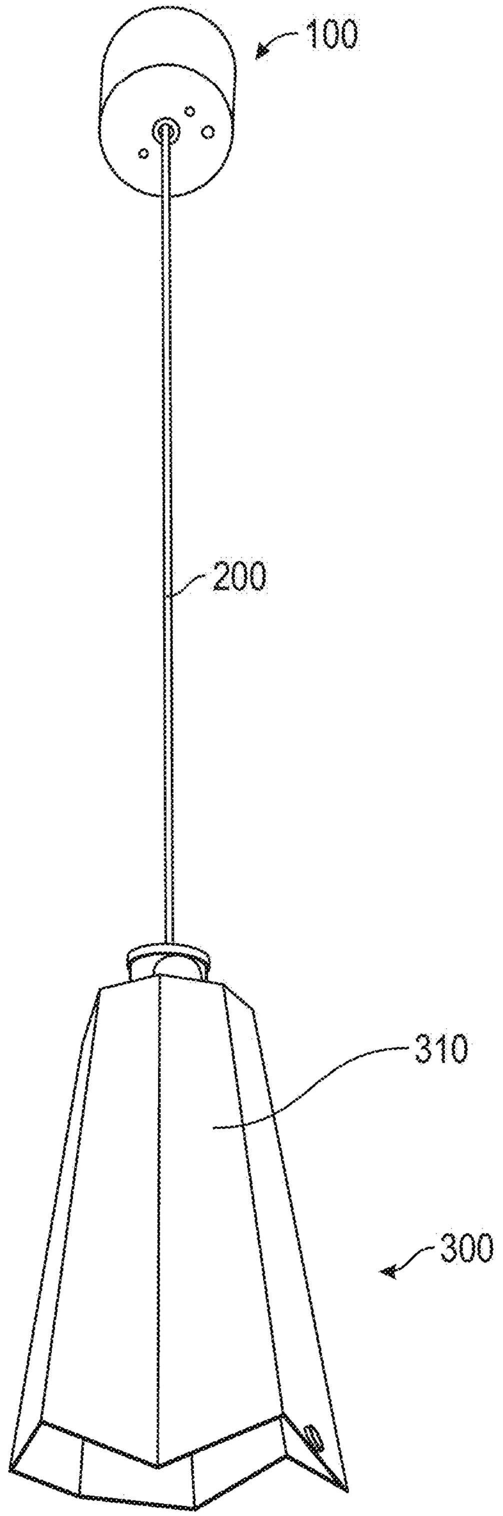
FIG. 15 is a perspective view of a height adjustable lamp assembly, according to another exemplary embodiment.

As shown in FIGS. 11-15, the lamp 300 includes a shroud, shown as lamp shade 310, and a holder, shown as lamp holder 320, disposed within the lamp shade 310. According to an exemplary embodiment, the lamp holder 320 is electrically coupled to the lower end 204 of the cord 200 and configured to receive a lamp bulb. The lamb bulb may be configured to thermally regulate (e.g., heat) an area beneath the lamp 300 and/or illuminate the area beneath the lamp 300. As shown in FIGS. 11-13, the lamp shade 310 has a bell shape. As shown in FIG. 14, the lamp shade 310 has a dome shape. As shown in FIG. 15, the lamp shade 310 has an elongated hexagon shape. In other embodiments, the lamp shade 310 has another shape.

In operation, the length L of the cord 200 exposed from the canopy 102 and, therefore, a height of the lamp shade 310 is adjustable a certain designed amount. In one embodiment, the length L is adjustable up to forty inches. In other embodiments, the length L is adjustable more or less than forty inches (e.g., based on the size of the reel 170, the length L of the cord 200, the size of the canopy 102, etc.). According to an exemplary embodiment, the position of the lamp 300 is held by friction between the cord 200 and the reel 170 and the lamp 300 acting as a counterweight. When a user wants to lower the lamp 300, the user can pull on the cord 200 and/or the lamp 300 to unwind more of the cord 200 from the reel 170. When a user wants to raise the lamp 300, the user can lift on the cord 200 and/or the lamp 300, which causes the spring 188 to spin the spool body 186 to wind up the cord 200 as the user raises the lamp 300.

Figure 16:
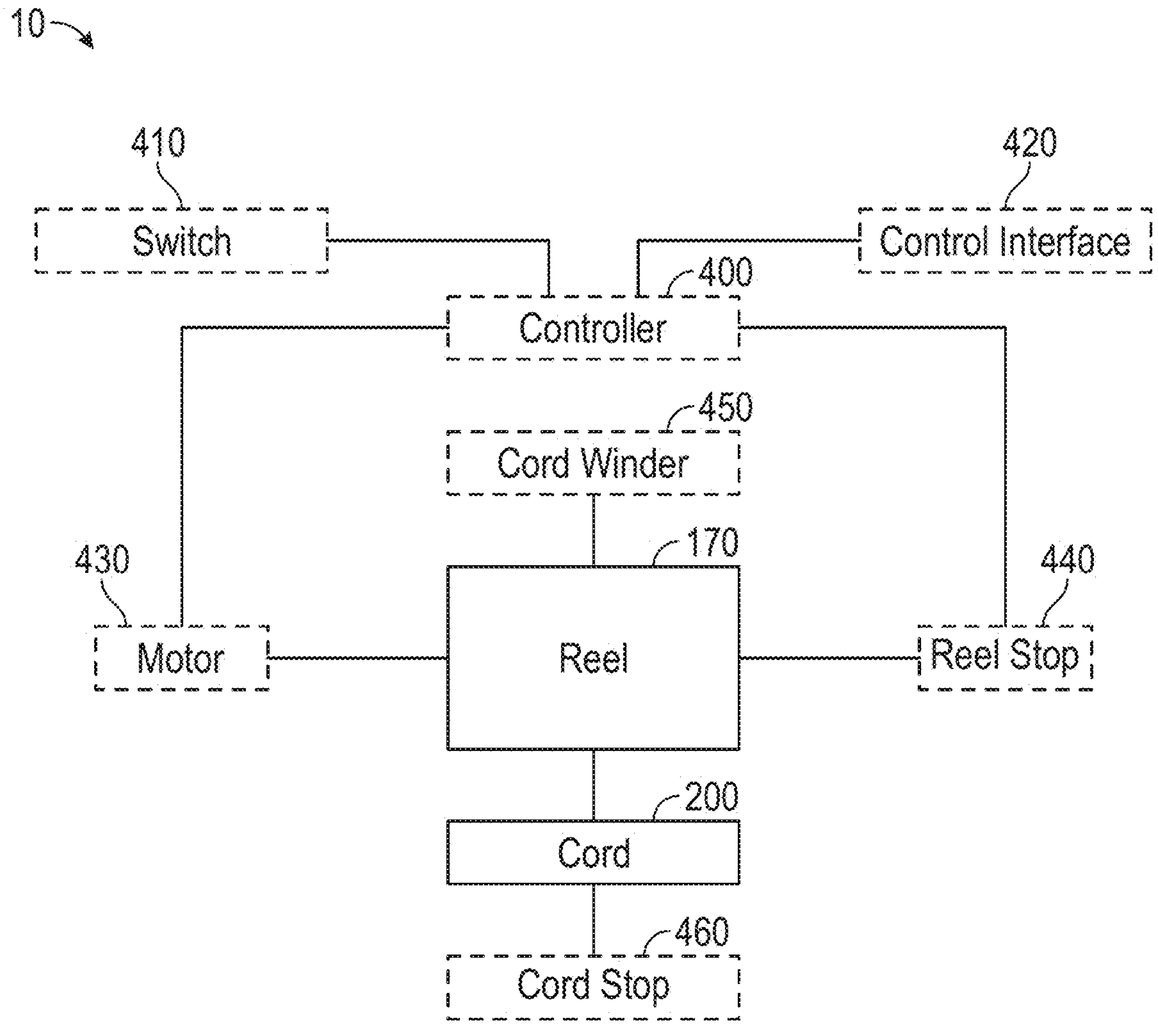
FIG. 16 is a schematic drawing of the height adjustable lamp assembly of FIG. 1, according to an exemplary embodiment.

As shown in FIG. 16, the height adjustable lamp assembly 10 may include one or more additional components including a controller 400, a switch 410, a control interface 420, a motor 430, a reel stop 440, a cord winder 450, and/or a cord stop 460. The controller 400 may be configured to control power provided to and/or settings of the lamp 300 (e.g., on, off, temperature, height adjustment, etc.), operation of the motor 430, operation of the reel stop 440, and/or operation of the cord winder 450 based on an input received from the switch 410 and/or the control interface 420. The switch 410 may be located on the lamp 300. The control interface 420 may be a device remote from the rest of the height adjustable lamp assembly 10 and wirelessly connected to the controller 400. By way of example, the control interface 420 may be a portable device (e.g., a smartphone, a tablet, a laptop, smartwatch, etc.) that provides access to an application (e.g., a web-based application, a smartphone application, a website, etc.) that provides a graphical user interface that facilitates controlling features of the height adjustable lamp assembly 10 (e.g., turn on, turn off, height adjustment, temperature adjustment, etc.). The motor 430 may be configured to drive the reel 170 to wind up or pay out the cord 200. The reel stop 440 may be configured to selectively lock the reel 170 in place. In some embodiments, the reel stop 440 includes a solenoid that operates as a mechanical stop to hold the reel 170 in place (e.g., by engaging with detents around the reel 170). In some embodiments, the reel stop includes a magnetic or an electromagnetic stop device that engages the reel 170 to hold the reel 170 in place. The cord winder 450 may be configured as a guide device that positions the cord 200 neatly onto the spool body 186 of the reel 170 as the cord 200 is wound up onto the spool body 186. The cord stop 460 may be an adjustable stop coupled to the cord 200 that prevents the cord 200 from retracting more than a certain amount into the canopy 102. By way of example, the cord stop 460 may be a thumbscrew or other fastening device positioned at a user selected position along the cord 200 and that engages with the canopy 102 to prevent the cord 200 from further retracting into the canopy 102 through the cord aperture 150. Accordingly, the cord stop 460 facilitates user selection of a maximum height of the height adjustable lamp assembly 10.

While the height adjustable lamp assembly 10 has mainly been described herein as a temperature regulation unit to thermally regulate the temperature of food, it should be understood that, in some embodiments, the lamp 300 may not provide a heating function but only a luminaire function, or may be replaced with another type of device, tool, or implement. By way of example, the lamp 300 may be replaced with an electrical outlet, a power tool (e.g., a drill, etc.), a hair dryer, and/or still other types of devices, tools, or implements.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrase "at least one of X, Y, and Z" or "at least one of X, Y, or Z," unless specifically stated otherwise, is understood to convey that an element may be either X, Y, Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the height adjustable lamp assembly 10 and the components thereof as shown in the various exemplary embodiments are illustrative only. Additionally, any element disclosed in one embodiment may be incorporated or utilized with any other embodiment disclosed herein.

The invention claimed is:

1. A height adjustable lamp assembly comprising:

a frame including:

- a mounting plate;
- a base plate defining a cord aperture; and
- an arm coupling the mounting plate to the base plate, the arm defining a first electrical connector interface and a slip ring interface;

a first electrical connector coupled to the first electrical connector interface; and a slip ring coupled to the slip ring interface, wherein the first electrical connector is configured to electrically couple to a power source, and wherein the slip ring is electrically coupled to the first electrical connector;

a reel rotationally supported by the frame;

an electrical cord wound around the reel, a lower end of the electrical cord extending through the cord aperture; and a lamp coupled to the lower end of the electrical cord, wherein the reel rotates to wind up or pay out the electrical cord therefrom to adjusts a height of the lamp.

2. The height adjustable lamp assembly of claim 1, further comprising a reel stop controllable to selectively engage with the reel to selectively lock the reel in a position.

3. The height adjustable lamp assembly of claim 2, wherein the reel stop is electrically operated.

4. The height adjustable lamp assembly of claim 3, wherein the reel stop includes at least one of (a) a solenoid or (b) a magnetic stop.

5. The height adjustable lamp assembly of claim 1, wherein the frame includes a rod assembly extending between the mounting plate and the base plate.

6. The height adjustable lamp assembly of claim 5, wherein the reel is coupled to the rod assembly.

7. The height adjustable lamp assembly of claim 5, wherein the mounting plate defines a first aperture, and the base plate defines a second aperture, and wherein the rod assembly engages with the first aperture and the second aperture.

8. The height adjustable lamp assembly of claim 5, wherein the reel includes a shaft defining an aperture through which a rod of the rod assembly extends.

9. The height adjustable lamp assembly of claim 1, wherein the arm includes a base mount detachably coupled to the base plate.

10. The height adjustable lamp assembly of claim 1, wherein the reel defines a second electrical connector interface, further comprising a second electrical connector coupled to the second electrical connector interface, wherein the second electrical connector is electrically coupled to the slip ring and the electrical cord.

11. The height adjustable lamp assembly of claim 1, wherein the arm extends downward from an edge of the mounting plate and terminates at the base plate.

12. The height adjustable lamp assembly of claim 1, wherein the arm is integrally coupled to at least one of the mounting plate or the base plate.

13. The height adjustable lamp assembly of claim 1, wherein the arm is detachably coupled to at least one of the mounting plate or the base plate.

14. The height adjustable lamp assembly of claim 1, wherein the reel includes a spring disposed therein, and wherein, as the lamp is manually lifted by an operator, the spring causes the reel to rotate to wind up the electrical cord.

15. The height adjustable lamp assembly of claim 1, further comprising an electrically operated cord winder configured to guide the electrical cord onto the reel.

16. The height adjustable lamp assembly of claim 1, further comprising a cord stop positioned along the electrical cord, the cord stop configured to prevent the electrical cord from retracting more than a predetermined amount through the cord aperture.

* * * * *